(12) United States Patent
Baker

(10) Patent No.: US 6,348,859 B1
(45) Date of Patent: Feb. 19, 2002

(54) REMOTELY-ACTUATED AUDIO/VISUAL ASSEMBLY

(76) Inventor: Franklin W. Baker, 5642 S. LaBrea, Apt. 9A, Los Angeles, CA (US) 90056

(*) Notice: Subject to any disclaimer, the term of this patent is extended or adjusted under 35 U.S.C. 154(b) by 0 days.

(21) Appl. No.: 09/472,919

(22) Filed: Dec. 27, 1999

(51) Int. Cl.[7] .................................................. B60Q 1/44
(52) U.S. Cl. ...................... 340/479; 340/432; 340/438; 340/468; 340/480; 362/84; 362/105; 362/106
(58) Field of Search ................................. 340/479, 467, 340/691.1, 693.5, 432, 465, 438, 468, 480; 362/106, 72, 479, 473, 105, 84, 103

(56) References Cited

U.S. PATENT DOCUMENTS

| | | | | |
|---|---|---|---|---|
| 4,319,308 A | * | 3/1982 | Ippoliti et al. | 362/106 |
| 4,559,516 A | * | 12/1985 | Schott et al. | 340/479 |
| 4,559,586 A | * | 12/1985 | Slarve | 340/479 |
| 4,891,736 A | * | 1/1990 | Gouda | 340/479 |
| 4,956,752 A | * | 9/1990 | Foglietti | 362/72 |
| 5,072,209 A | * | 12/1991 | Hori et al. | 230/432 |
| 5,128,844 A | * | 7/1992 | Landais | 362/105 |
| 5,353,008 A | * | 10/1994 | Eikenberry et al. | 340/479 |
| 5,469,342 A | * | 11/1995 | Chien | 362/84 |
| 5,704,707 A | * | 1/1998 | Gebelein et al. | 362/106 |
| 5,910,764 A | * | 6/1999 | Hayden | 340/479 |
| 5,916,181 A | * | 6/1999 | Socci et al. | 600/595 |

* cited by examiner

Primary Examiner—Edward Lefkowitz
Assistant Examiner—Davetta W. Goins
(74) Attorney, Agent, or Firm—Albert O. Cota

(57) ABSTRACT

A remotely-actuated audio/visual assembly (10) which consists of a signal transmitting circuit (12) and a signal receiving circuit (58). The circuit (12) is designed to be remotely located from the circuit (58). The circuit (12) is typically connected in parallel with a vehicle brake light (14) such that when the brakes are applied, power is supplied simultaneously to the brake lights and to a transmitter (38) which produces an output signal (46). The output signal (46) is applied to a receiver (60) in the circuit (58) which in turn produces an output signal (64) which enables a control circuit (70) which is programmed to control the operation of a visual display (80) and an optional audio alarm. In one application the signal receiving circuit (58), which includes the visual display (80) is attached to the rear external surface of a motorcycle helmet (220). Thus, when the motorcycle's brakes are applied, the visual display (80) is activated, thereby allowing a following vehicle to more readily see and understand that the motorcycle is slowing down or preparing to stop.

3 Claims, 5 Drawing Sheets

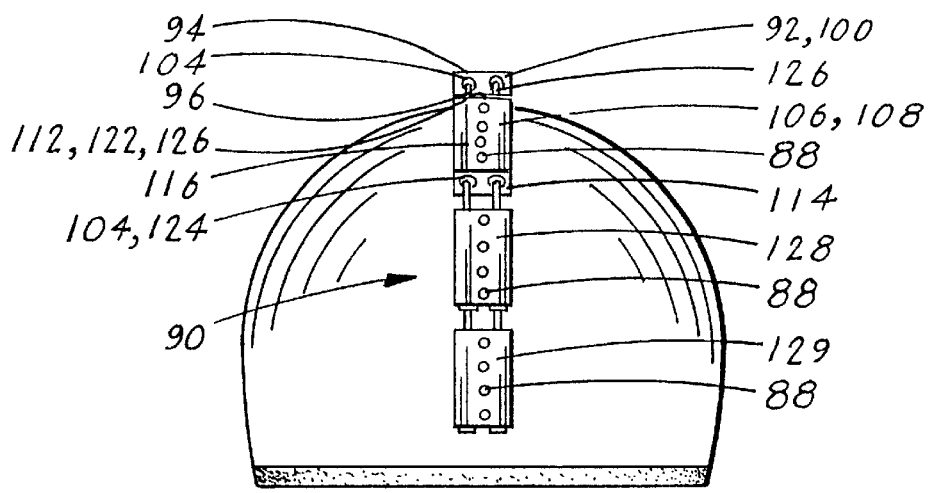
FIG. 5
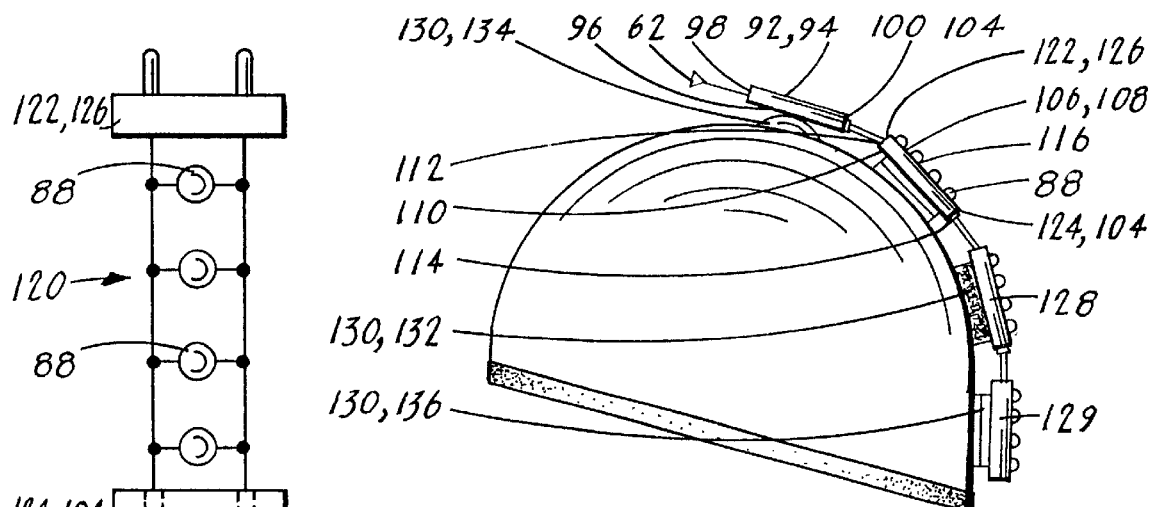
FIG. 7
FIG. 6
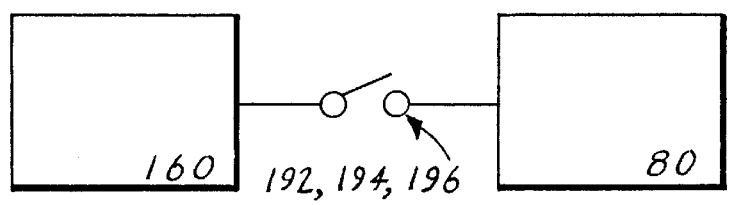
FIG. 8

REMOTELY-ACTUATED AUDIO/VISUAL ASSEMBLY

TECHNICAL FIELD

The invention pertains to the general field of audio/visual assemblies and more particularly to a remotely actuated assembly that is adaptable for use on a structure such as a motorcycle helmet.

BACKGROUND ART

One of the most economical and popular means of transportation in today's world is a two-wheeled vehicle, such as a motorcycle or bicycle. In fact, in some parts of the world, particularly many Eastern countries, bicycles are the Most common means of transportation. The reasons for this are many; for instance, a motorcycle, moped, or any motor-driven, two-wheeled vehicle is considerably cheaper to purchase than a conventional car. These vehicles also use much less fuel and therefore are more economical to operate. Bicycles, which only require "fuel" from the person riding them, are even more economical, and for persons who do not need to travel long distances are more practical.

Unfortunately, the use of two-wheeled vehicles does have its drawbacks. The most obvious being that these two-wheeled vehicles are inherently more dangerous than cars and other vehicles. In an accident between a car and a motorcycle, for example, the car and its passenger(s) may receive minor damage and injuries while the motorcycle may be completely demolished and the rider severely injured or killed. Bicycles fare even worse.

In response to the dangers of riding a two-wheeled vehicle, some countries, such as the United states have made it mandatory that certain safety precautions be taken when riding. A typical example of this is the helmet law, which requires all riders of motorcycles to wear a helmet at all times while riding. It is also quite common to see adults and children who ride bicycles to be wearing helmets, as well as other protective devices and clothing.

While these safety precautions undoubtedly provide some added safety, one of the most serious risks to two-wheeled vehicles is the fact that, as a result of the smaller size of most of these vehicles, they are often very difficult to see.

Motorcycles have as standard equipment lights that function in the same manner as those on four-wheeled vehicles. There are head and tail lights, turning indicators and brake lights. Similar lights are also available as aftermarket products for bicycles.

These lights do function as they are intended to, but, again due to the size of most two-wheeled vehicles, the lights are sometimes difficult to see. This is especially true of brake lights, which usually consist of only a single light mounted on the tail of a motorcycle or bicycle.

Just as the United States made it mandatory for all new cars after 1986 to have a third brake light, it would be extremely beneficial for motorcycles and other two-wheeled vehicles to have an additional light or lights. Depending on the application, the light(s) would function much better if they were mounted or attached at a location that is in the direct line of sight of other drivers, such as at the head level of the two-wheeled vehicle rider.

A search of the prior art did not disclose any patents that read directly on the claims of the instant invention however, the following U.S. patents were considered related:

| U.S. PAT. NO. | INVENTOR | ISSUED |
| --- | --- | --- |
| 5,353,008 | Baker, et al | 4 October 1994 |
| 5,040,099 | Harris | 13 August 1991 |
| 4,901,210 | Hanabusa | 13 February 1990 |

The U.S. Pat. No. 5,353,008 patent discloses a motorcycle helmet with a brake light that includes a duty cycled receiver circuit for receiving a radio frequency (RF) signal from a transmitter located on the motorcycle. The receiver circuit is turned off if the RF signal is not present, and when the receiver detects the RF signal, the receiver is turned on and the brake light is illuminated.

The U.S. Pat. No. 5,040,099 patent discloses a helmet for a motorcycle or the like having a rearward facing auxiliary brake lamp secured thereto, spaced from and connected by an optic or sonic link to the brake light operating system of the motorcycle. The auxiliary lamp is caused to illuminate with the illumination of the brake lamp of the motorcycle.

The U.S. Pat. No. 4,901,210 patent discloses a device for use with a motorcycle helmet which directs a safety light rearward from the lower back portion of the helmet. The light is removably mounted onto the helmet with a variety of mounting apparatus, each of which allows the light to be quickly and conveniently installed and removed from the helmet. The light, which is entirely self-contained, is mounted onto the helmet in a way allowing the light to detach itself during an accident to avoid inflicting serious head or neck injury on the rider.

For background purposes and as indicative of the art to which the invention relates, reference may be made to the following remaining patents found in the search.

| PATENT NO. | INVENTOR | ISSUED |
| --- | --- | --- |
| 5,910,764 | Hayden | 8 June 1999 |
| 5,704,707 | Gebelein, et al | 6 January 1998 |
| 5,567,038 | Lary | 22 October 1996 |

DISCLOSURE OF THE INVENTION

The remotely-actuated audio/visual assembly, in its most basic design is comprised of the following elements: a signal transmitting circuit, consisting of a power switch, a D-C power source and a transmitter that is connected through the power switch to the D-C power source. When the power switch is activated the transmitter becomes enabled and thus produces an output signal via a transmitting antenna.

The assembly further comprises a remotely located signal receiving circuit, which is powered by a battery and that consists of a receiver having means for receiving the output signal from the transmitter via a receiving antenna. The receiver processes the transmitted signal and produces an output signal that is applied to a control circuit having means for receiving and processing the output signal and producing at least a first control signal.

The first control signal is connected to and activates a visual display, which typically is comprised of a light source which can consist of a strobe light, an incandescent or fluorescent lamp or a light emitting diode. Optionally, the control circuit can also produce a second control signal that operates an audio alarm in combination with the light source.

In View of the above disclosure, the primary object of the invention is to provide a means by which a visual and/or audio signal may be remotely controlled and thus displayed at a desired or required time.

Another object of the invention is to provide a means by which the assembly can be used as a safety device, particularly when the visual display is attached to a helmet that is worn when riding a bicycle, a motorcycle or other similar vehicles.

Yet another object of the invention is to provide a safety device that can be used in any application that requires the remote control of an audio or visual display to give notice of potential danger.

Still another object of the invention is to provide an audio and/or visual display that can be inter-connected with an existing system for additional safety. When the visual display consists of a strobe light, that is operated in combination with a third brake light, the stroke light provides a following driver with a more vivid alert/warning that the forward vehicle is braking or is about to come to a sudden stop. This vivid warning gives the following driver a few more seconds to react to the warning and apply the brakes.

In addition to these objects of the invention it is also the object to provide a remotely-actuated audio/visual assembly that:

is easy to install and use, can be used for a variety of functions in different applications, can be customized with whatever audio and/or visual display is desired, when used on a helmet can be placed on the back surface of the helmet to warn following motorists that the forward vehicle is braking, is economical from both a manufacturer's and a consumer's point of View, and when used with a helmet, can be sold as a standard component of the helmet, or as an aftermarket addition.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a rear elevational view of a motorcycle helmet having attached an articulated structure having a plurality of enclosures which enclose a receiving circuit, a battery and a plurality of inline LED's.

FIG. 6 is a side elevational view of a motorcycle helmet having attached an articulated structure having a plurality of enclosures which enclose a receiving circuit, a battery and a plurality of inline LED's FIG. 7 is a schematic diagram showing a series of parallel connected LED's connected on an end to a male connector an opposite end to a female connector.

FIG. 8 is a block/schematic diagram showing either a power switch or a tilt switch connected between the battery and visual display wherein when either switch is closed the visual display is energized.

BEST MODE FOR CARRYING OUT THE INVENTION

Figure 1:
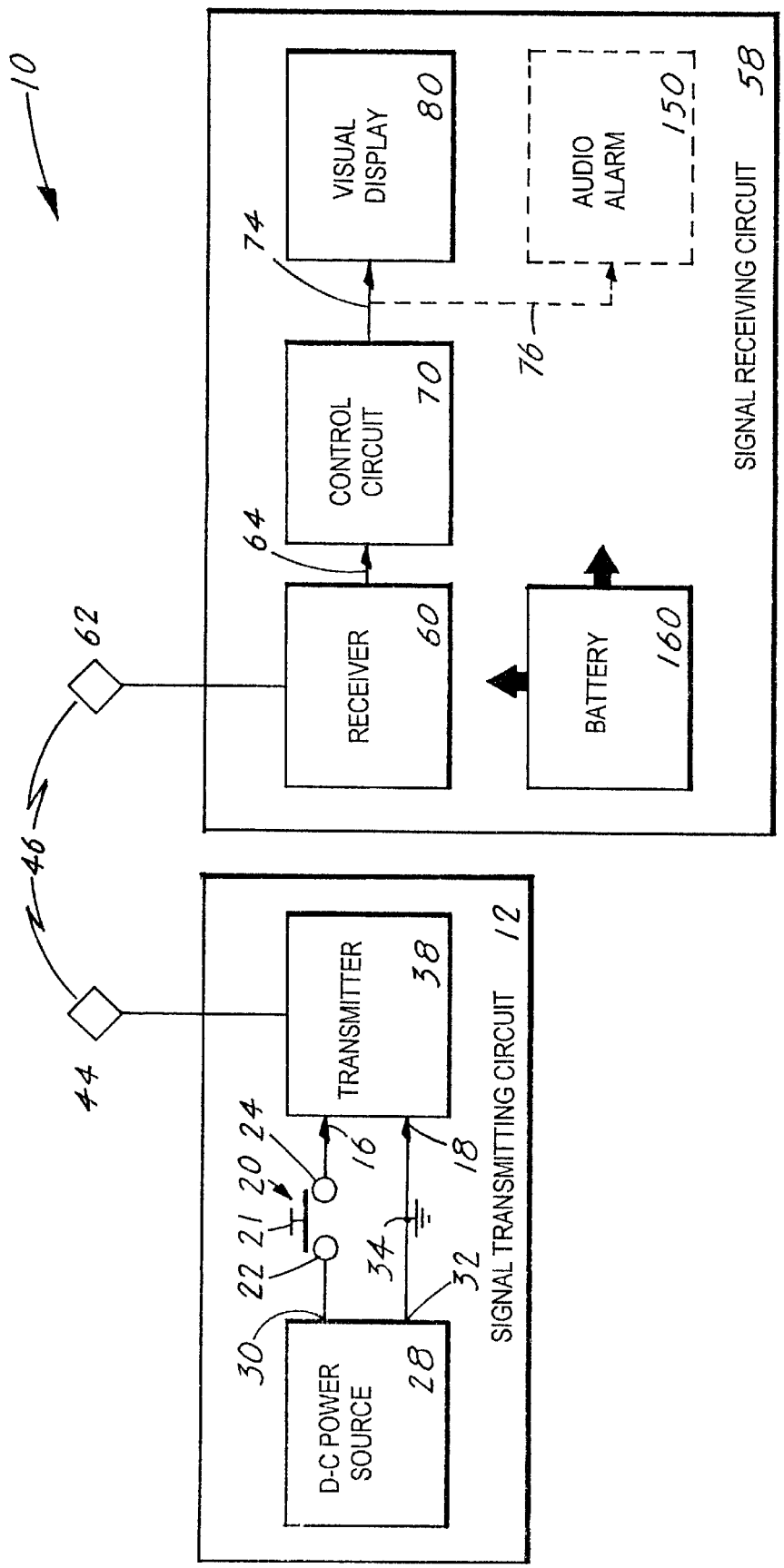
FIG. 1 is a block diagram of a basic design for a remotely-actuated audio/visual assembly.

The best mode for carrying out the remotely actuated audio/visual assembly is presented in terms of a preferred embodiment which is disclosed in three design configurations. The first design is a basic design, the second is a fully implemented design, and the third is a design for a distance determining circuit which can easily be-added to the basic or fully implemented design.

The preferred embodiment of the remotely-actuated audio/visual assembly 10 is shown in FIGS. 1–9 and is comprised of the following major elements: a signal transmitting circuit 12, a signal receiving circuit 58, a visual display 80 and an audio alarm 150.

Figure 2:
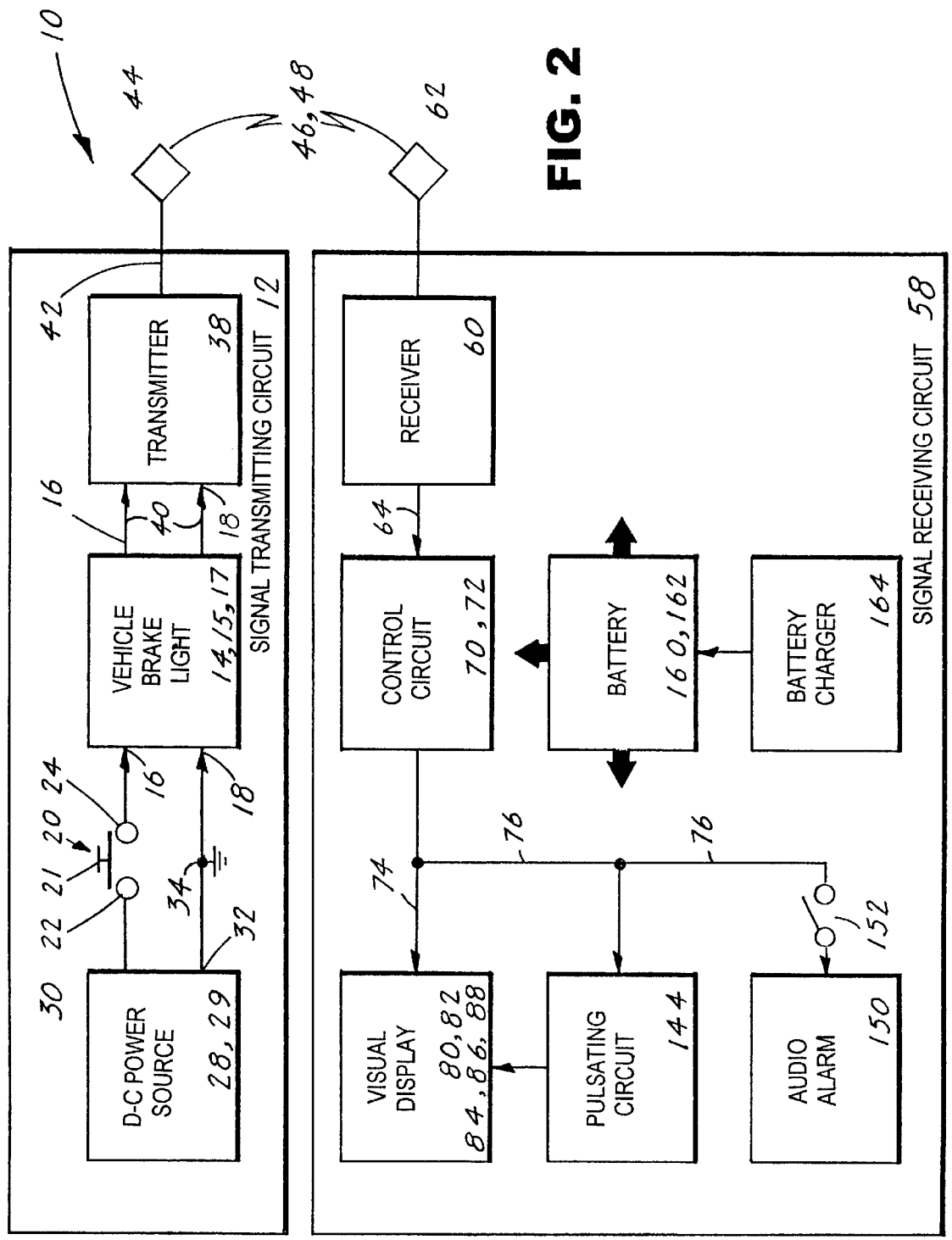
FIG. 2 is a block diagram of a fully-implemented design for a remotely-actuated audio/visual assembly.

The signal transmitting circuit 12 is shown in its basic form and function in FIG. 1 and in a fully implemented design in FIG. 2. For the purpose of discussion only the design of FIG. 2 is presented.

The signal transmitting circuit 12 is comprised of a hazard light such as a vehicle brake light 14, a power switch 20, a D-C power source 28 and a transmitter 38. The vehicle brake light 14, which can consist of either one of the standard brake lights 15 located on a vehicle or a centrally located third brake light 17, has a first lead 16 and a second lead 18. The power switch 20, as shown in FIGS. 1 and 2, has a first contact 22 connected to the positive terminal 30 on the D-C power source 28 and a second contact 24 connected to the first lead 16 on the brake light 14. Typically, the power switch 20 is comprised of a vehicle brake switch that is activated when the vehicle brake pedal 21 is depressed.

The negative terminal 32 of the power source 28 is connected to the second lead 18 on the brake light 14 and to a common ground 34. For use on a vehicle, the D-C power source 28 is comprised of a vehicle battery 29.

The transmitter 38, as also shown in FIGS. 1 and 2 has an input 40 and an output 42. The input 40 is connected across the first and second leads 16,18 of the brake light 14. When the-power switch 20 is closed, the D-C power from the D-C power source 28 causes the vehicle brake light 14 to illuminate and simultaneously enables the transmitter 38, which provides an output signal 46 via a transmitting antenna 44. The transmitter 38 can be designed to produce an output signal 46 consisting of a coded data signal 48 that can consist of three composite signals: the first composite signal utilizes an RF signal as a carrier with a superimposed audio signal; the second composite signal utilizes an audio signal as a carrier with a superimposed second audio signal; and the third composite signal utilizes an infrared signal as a carrier with a superimposed audio signal.

From the transmitter 38 the signal 46 is sent to the signal receiving circuit 58. The signal receiving circuit 58, as shown in FIGS. 1 and 2, is comprised of a receiver 60, a control circuit 70, a visual display 80, an audio alarm 150 and a battery 160. The receiver 60 has means for receiving the output signal 46 via a receiving antenna 62, processing the transmitted signal 46 and producing an output signal 64. The control circuit 70, which typically consists of a microcontroller 72, has means for receiving and processing the output signal 64 from the receiver 60, and producing a first control signal 74 and a second control signal 76.

Once the control circuit 70 processes the signal 64, the visual display 80, as shown in FIGS. 1 and 2, is activated by the first control signal 74. Depending on the application for which the assembly 10 is utilized, the visual display 80 can be comprised of a fluorescent lamp 82, an incandescent lamp 84, a strobe light 86 or a light emitting diode (LED) display 88.

As shown in FIGS. 5, 6 and 7 the LED display 88 may be enclosed within an articulated structure 90 that can be comprised of several enclosures connected in series as also shown in FIGS. 5 and 6. The first enclosure 92 has an upper surface 94, a lower surface 96, a front surface 98, a rear surface 100 and is dimensioned to enclose the signal receiving circuit 58 which includes the battery 160. The output of the control circuit 70 is connected to a pair of female connectors 104 projecting outward from the rear surface 100.

A second enclosure 106 also has an upper surface 108, a lower surface 110, a front surface 112, and a rear surface 114. The upper surface 108 has a plurality of inline bores 116, as shown in FIG. 5, into which are attached a like plurality of inline LED's 88 that protrude outward from the plurality of inline bores 116. AS shown in FIG. 7, the LED's 88 are connected in a parallel circuit 120 having a first end 122 and a second end 124. The first end 122 terminates with a male connector 126 projecting outward from the front surface 112, which is connected to the female connector 104 on the first enclosure 92. The second end 124 of the LED's 88 terminates with a similar female connector 104 projecting outward from the rear surface 114. The third enclosure 128, as well as any subsequent enclosures 129 are each similar in design and function to the second enclosure 106, and are connected in series with the preceding enclosure.

In order to secure the lower surface 96 and 110 of the first, second, third and subsequent enclosures 92, 106, 128, as well as any subsequent enclosures 129, to an Upper surface of a structure such as a bicycle or motorcycle helmet 220, an attachment means 130 is utilized. The attachment means 130 may be comprised of an adhesive 132, suction cups 134, or a hook and loop fastener 136, such as VELCRO®. In lieu of the LED articulated structure 90, an integrated structure (not shown) can be molded directly on the surface of the bicycle or motorcycle helmet 220.

Depending on the application of the assembly 10, when the visual display 80 is comprised of the incandescent lamp 84 or the strobe light 88, a pulsating circuit 144, as shown in FIG. 2, may be used. The circuit 144, which is controlled by the signal 76 from the microcontroller 72, causes the visual display 80 to blink at a selectable rate.

A further element of the signal receiving circuit 58 is an audio alarm 150 that is activated by the second control signal 76 produced by the control circuit 70. Typically, the audio alarm 150 is comprised of an audio speaker 154 or an audio transducer 156. As shown in FIG. 2, before the audio alarm 150 can be activated a manually controlled audio alarm switch 152 must be closed.

In order to provide the required Power levels to operate the signal receiving circuit 58, a battery 160 is utilized. The battery 160 is shown in block diagram in FIGS. 1 and 2, and in use in FIGS. 3–6. The battery 160 is preferably comprised of a rechargeable battery 162 that is connected to a battery charger 164, which can be connected to a vehicle cigarette lighter receptacle or hardwired directly to a vehicle power source.

Figure 3:
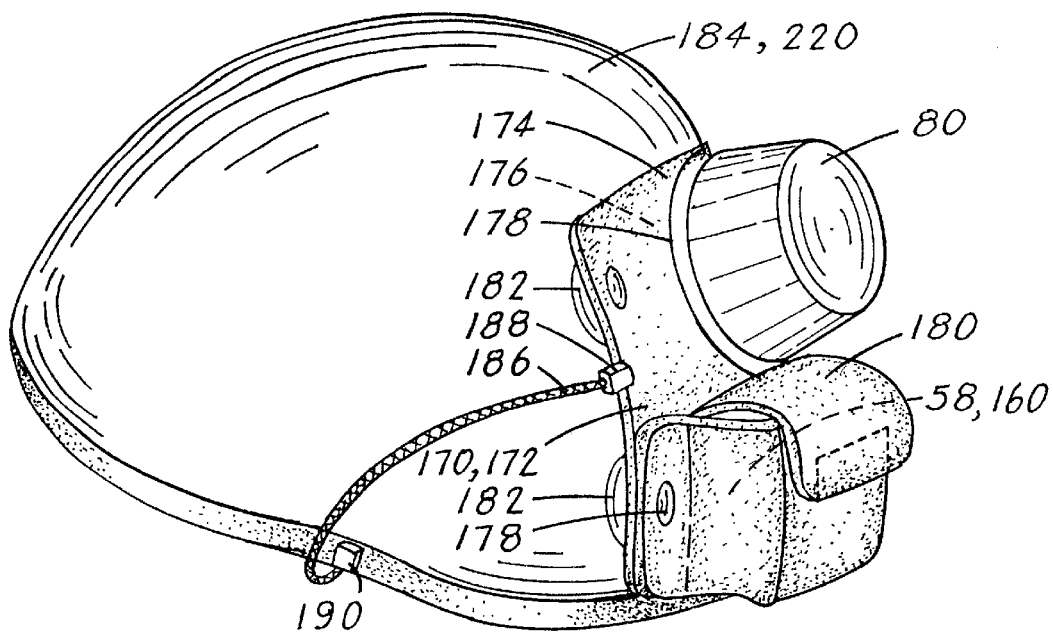
FIG. 3 is a perspective view of a motorcycle helmet to which is attached a removable enclosure which includes a signal receiving circuit consisting of a visual display and a packet which encloses a receiver, a control circuit and a battery.
Figure 4:
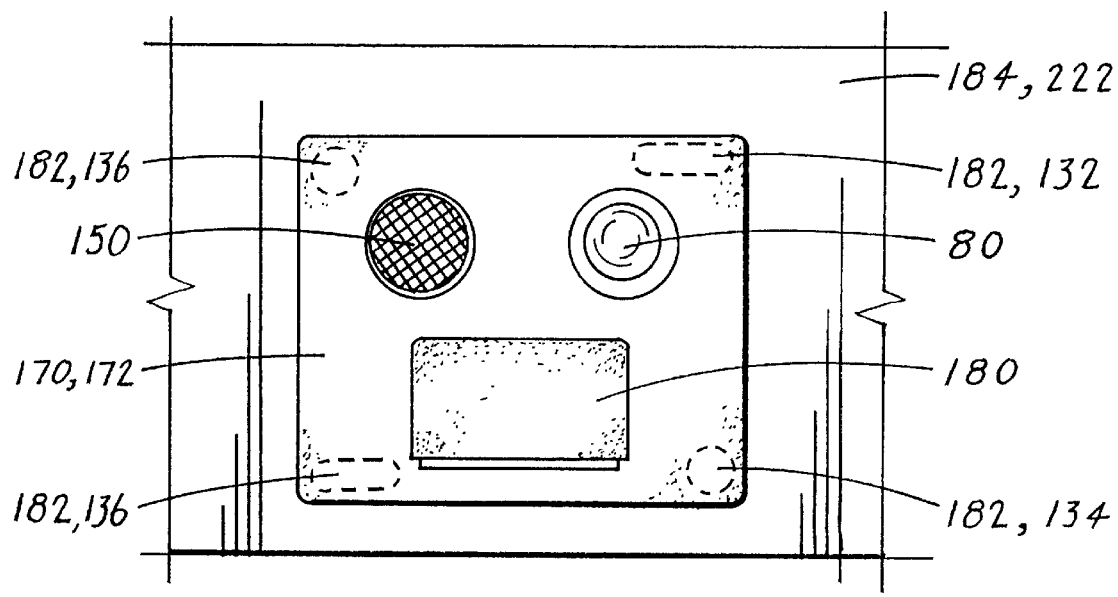
FIG. 4 is a plan view of a fully implemented signal receiving circuit which is attached to an attachment surface such as a dashboard or rear Panel of an automobile.

As shown in FIGS. 3 and 4, the signal receiving circuit 58 may be enclosed in a remote enclosure 170 which is preferably waterproof. The remote enclosure 170 is comprised of a conformable material 172 having an upper surface 174 and a lower surface 176. Attached to the upper surface 174, by an attachment means 178, is the visual display 80 and a packet 180 which encloses the receiver 60, the control circuit 70, and the battery 160. To the lower surface 176 is attached at least one attachment element 182, which allows the remote enclosure 170 to be releasably attached to an attachment surface 184.

Additionally, to the upper surface 174 may further be attached the audio alarm 150 (not shown). Typically, the attachment element 182 is comprised of the adhesive 132, at least one suction cup 134, or the hook and loop fastener 136 which are shown in FIG. 3 and also shown in use with the articulated structure 90 in FIG. 6. The attachment surface 184 is comprised of an upper surface of a bicycle or motorcycle helmet 220, as shown in FIG. 3 or a vehicle structure 222 such as a dashboard as shown in FIG. 4.

As shown in FIG. 3, the assembly 10 further comprises a removable safety strap 186. The safety strap 186 has a first end to which is attached a first clip 188 and a second end to which is attached a second clip 190. As shown in FIG. 3, the first clip 188 is clipped to an edge of the conformable material 172 on the remote enclosure 170 and the second clip 190 is clipped to the edge of the helmet 220.

To add to the utility and function of the assembly 10, a power switch 192, as shown in FIG. 8, may be connected between the battery 160 and the visual display 80. When the switch 192 is manually closed the visual display 80 is energized. The power switch 192 can also be comprised of a tilt-activated switch 194 that is designed to close when the helmet 220 is tilted in a left or right direction as when making a left or right turn. An additional tilt switch 194 can also be added to close when a forward or rearward force is applied to the helmet 220 or when making a sudden stop. In lieu of separate tilt switches 194 an omnidirectional motion switch, such as an accelerometer 196 can be utilized that closes regardless of the tilt position of the helmet 220.

Figure 9:
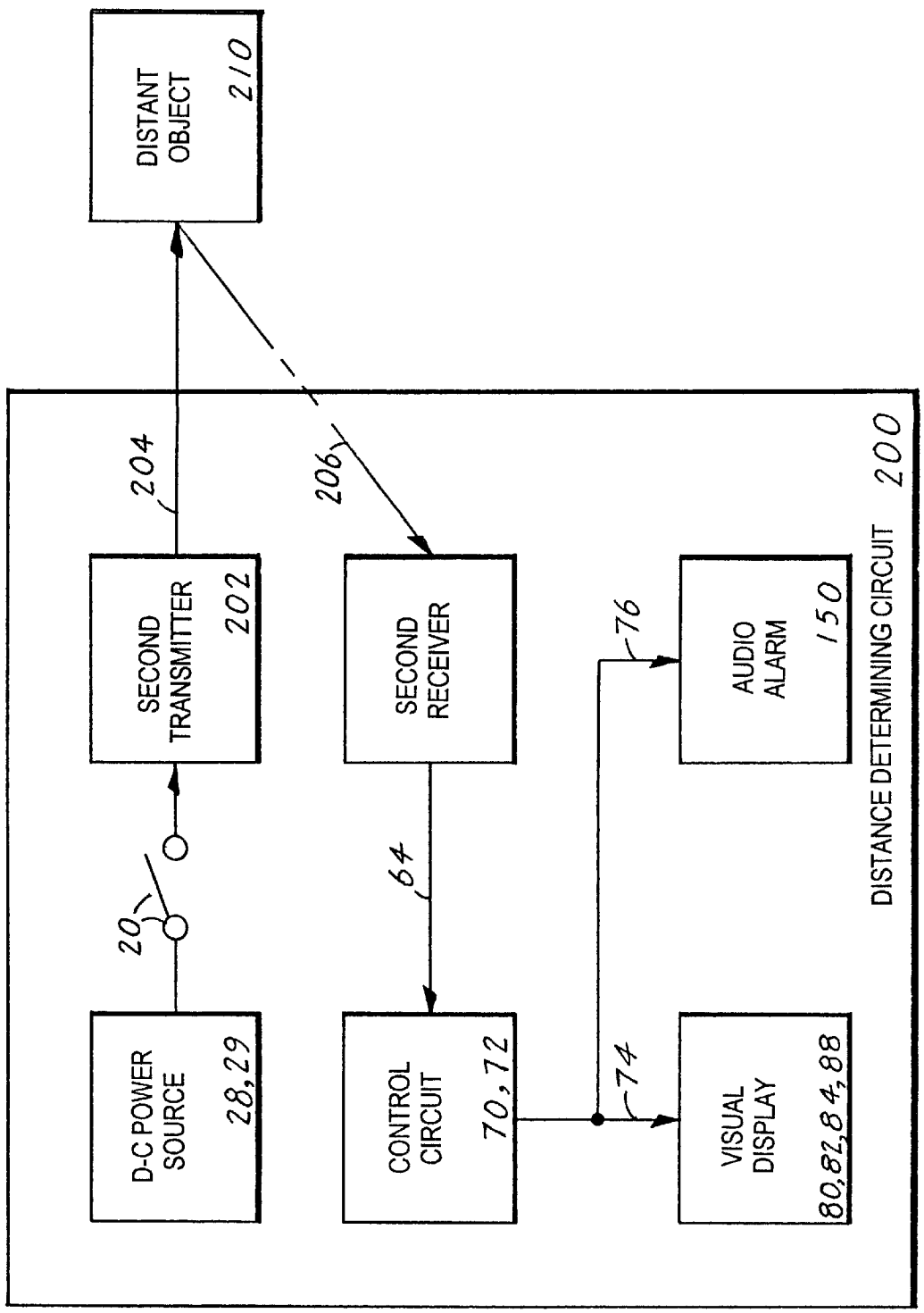
FIG. 9 is a block diagram of a distant determining circuit that can be included with the basic design of the remotely-actuated audio/visual assembly.

As shown in FIG. 9, the assembly 10 may further comprise a distance determining circuit 200. The circuit 200 is comprised of a second transmitter 202 having means for producing a first signal 204. The first signal 204 consists of a short burst of directional RF energy that is directed toward a distant object from where a second signal 206, consisting of a reflected burst of RF energy, is produced. A second receiver 208 has means for receiving the second signal 206 and producing an output signal which enables the microcontroller 72. The microcontroller 72 determines the distance of the distant object by calculating the time from the transmission of the first signal 204 from the second transmitter 202 to the reception of the second signal 206 by the second receiver 208 by dividing by two the time for the round trip of the two signals 204, 206 and knowing the speed of the signals. If the time is equal to or less than a predetermined time stored in the microcontroller 72, the microcontroller produces the first control signal 74 which activates the visual display 80 and the second control 76 signal that activates the audio alarm 176.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

What is claimed is:

1. A remotely-actuated audio/visual light assembly comprising:

a) a signal transmitting circuit comprising:
   (1) a vehicle brake light or hazard light having a first lead and a second lead, wherein said vehicle comprises a two or four-wheeled vehicle,
   (2) a power switch having a first contact and a second contact, wherein the second contact is connected to the first lead on said brake light,
   (3) a d-c power source having a positive terminal connected to the first contact on said power switch and a negative terminal connected to the second lead on said brake light or hazard light and to a common ground,
   (4) a transmitter having an input and an output, wherein the input is connected across the first and second leads of said brake light, wherein when said Power switch is activated the d-c power from said d-c power source causes said vehicle brake light to illuminate and simultaneously enables said transmitter which produces an output signal via a transmitting antenna, b) a portable signal receiving circuit enclosed in a remote, waterproof enclosure comprising a conformable material having an upper surface and a lower surface, wherein to the upper surface is attached, by an attachment means, a visual display and a packet which encloses said receiver, said control circuit and said battery, wherein to the lower surface is attached at least one attachment element which allows said remote enclosure to be releasably attached to an attachment surface comprising the rear or sides of a motorcycle or bicycle helmet as used when operating said two-wheeled vehicle or the rear or sides of said four-wheeled vehicle truck, said circuit comprising:
   (1) a receiver having means for receiving the output signal from said transmitter via a receiving antenna, processing the transmitted signal and producing an output signal,
   (2) a control circuit having a microcontroller for processing the output signal from said receiver and producing a first control signal and a second control signal,
   (3) said visual display comprising a light emitting diode (LED) display that is activated by the first signal produced by said control circuit,
   (4) a manually controlled audio alarm switch which is closed before said audio alarm is activated, said audio alarm comprising a speaker or audio transducer that is activated by the second control signal produced by said control circuit, and
   (5) a battery selected to provide the required power levels to operate said signal receiving circuit, and c) a removable safety strap having a first end to which is attached a first clip and a second end to which is attached a second clip, wherein the first clip is clipped to an edge of the conformable material on said remote enclosure and the second clip is clipped to an edge of said helmet.

2. The assembly as specified in claim 1 wherein said attachment element comprises at least one suction cup.

3. The assembly as specified in claim 1 wherein said attachment element comprises at least one combination of hook and loop fasteners.

* * * * *